(12) United States Patent
Bitauld

(10) Patent No.: US 10,761,068 B2
(45) Date of Patent: Sep. 1, 2020

(54) METHOD AND APPARATUS FOR SPECTROSCOPY

(71) Applicant: Nokia Technologies Oy, Espoo (FI)

(72) Inventor: David Bitauld, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 164 days.

(21) Appl. No.: 15/895,475

(22) Filed: Feb. 13, 2018

(65) Prior Publication Data

US 2019/0056359 A1    Feb. 21, 2019

(30) Foreign Application Priority Data

Feb. 14, 2017  (EP) .................................... 17156137

(51) Int. Cl.
| | |
|---|---|
| G01N 29/46 | (2006.01) |
| G01N 29/24 | (2006.01) |
| G01N 21/17 | (2006.01) |
| B06B 1/04 | (2006.01) |
| G01N 29/12 | (2006.01) |

(52) U.S. Cl.
CPC ............... *G01N 29/46* (2013.01); *B06B 1/04* (2013.01); *G01N 21/1702* (2013.01); *G01N 29/12* (2013.01); *G01N 29/2418* (2013.01); *G01N 2291/0422* (2013.01); *G01N 2291/0423* (2013.01)

(58) Field of Classification Search
CPC ....... G01N 29/2412; G01N 2291/0422; G01N 2291/0423; G01N 29/2418; B06B 1/04
See application file for complete search history.

(56) References Cited

U.S. PATENT DOCUMENTS

| | | | | |
|---|---|---|---|---|
| 5,255,075 A | * | 10/1993 | Cush .................... | G01N 21/552 356/128 |
| 5,432,610 A | * | 7/1995 | King ..................... | G01N 21/65 356/301 |
| 5,748,309 A | * | 5/1998 | van der Weide ..... | G01J 3/4338 356/326 |
| 7,075,957 B2 | * | 7/2006 | Kallmann ............ | H04B 10/504 331/18 |
| 7,277,178 B2 | * | 10/2007 | Shpantzer ............ | G01N 21/171 356/451 |
| 7,291,839 B1 | * | 11/2007 | Demers ................ | G01J 3/42 250/338.1 |
| 7,307,774 B1 | * | 12/2007 | Schnitzer ........... | G01N 21/6458 359/198.1 |
| 2016/0153835 A1 | * | 6/2016 | Lee ........................ | G01J 3/453 250/339.08 |

(Continued)

OTHER PUBLICATIONS

Frank K. Tittel et al., 'Emerging Infrared Laser Absorption Spectroscopic Techniques for Gas Analysis', John Wiley & Sons, Inc, 2012, pp. 71-109 (Year: 2012).*

(Continued)

*Primary Examiner* — Clayton E. LaBalle
*Assistant Examiner* — Kevin C Butler
(74) *Attorney, Agent, or Firm* — Harrington & Smith

(57) ABSTRACT

A method including: generating a first comb optical signal; generating a second comb optical signal; exciting a sample using in combination the first comb optical signal and the second comb optical signal; and detecting at the sample an acoustic response of the sample.

13 Claims, 5 Drawing Sheets

(56) References Cited

U.S. PATENT DOCUMENTS

2019/0056359 A1* 2/2019 Bitauld .................. G01N 29/46

OTHER PUBLICATIONS

Written Opinion of the International Searching Authority, PCT/CA2008/001198, dated Sep. 26, 2008, ISA, 5pgs (Year: 2008).*
Lenth, Wilfried, Optical heterodyne spectroscopy with frequency- and amplitude modulated semiconductor lasers, Optics Letters vol. 8, No. 11, Nov. 1983, pp. 575-577 (Year: 1983).*

* cited by examiner

METHOD AND APPARATUS FOR SPECTROSCOPY

TECHNOLOGICAL FIELD

Embodiments of the present invention relate to spectroscopy. In particular, they relate to using spectroscopy to identify one or more low concentration substances.

BACKGROUND

Spectroscopy is the study of the interaction between matter and electromagnetic radiation as a function of the wavelength or frequency of the electromagnetic radiation. As different substances have different electron arrangements, they interact differently with electromagnetic radiation. A particular substance may therefore have a distinctive absorption spectra in that it absorbs electromagnetic radiation at certain well-defined frequencies but does not absorb radiation at other frequencies. Spectroscopy can therefore be used for the identification of particular substances.

It would be desirable to develop spectroscopy so that it is operable over a broad range of optical frequencies to detect substances at very low concentration values such as parts per million or even parts per billion.

A substance is matter which has a specific composition and specific properties. An element is a substance. A compound, for example a molecule, is a substance. Spectroscopy may be used to identify one or more substances in a mixture.

BRIEF SUMMARY

According to various, but not necessarily all, embodiments of the invention there is provided a method comprising: generating a first comb optical signal;
generating a second comb optical signal; exciting a sample using in combination the first comb optical signal and the second comb optical signal; and detecting at the sample an acoustic response of the sample.

According to various, but not necessarily all, embodiments of the invention there is provided an apparatus comprising: a generator configured to generate a first comb optical signal; a generator configured to generate a second comb optical signal; optics configured to cause excitation of a sample by combining the first comb optical signal and the second comb optical signal; and one or more pressure transducers configured to detect at the sample pressure variations caused by an acoustic response of the sample.

According to various, but not necessarily all, embodiments of the invention there is provided examples as claimed in the appended claims.

BRIEF DESCRIPTION

For a better understanding of various examples that are useful for understanding the detailed description, reference will now be made by way of example only to the accompanying drawings in which.

DETAILED DESCRIPTION

In the examples below, the method and apparatus advantageously use a combination of a first comb optical signal and a second comb optical signal to excite a sample and then detect at the sample an acoustic response of the sample.

The use of comb optical signals allows for very high resolution sampling of the absorption spectra of the sample at each frequency of the comb signals. This enables the, in parallel, measurement of the sample over a broad bandwidth of frequencies. The combination of the first comb optical signal and the second comb optical signal, when they fall within the absorption spectra of the sample, cause excitation of the sample and an acoustic response of the sample at a heterodyne frequency determined by the absorption of the sample and the first and second comb optical signals. The heterodyne frequency of response may be detected and this may enable identification of the sample.

Each pair of first and second comb optical signals, at a similar optical frequency (optical mode) will produce an intensity beating at the heterodyne frequency. Intensity in this context is luminance (radiant flux or power per unit area). If the combs' optical frequencies at that optical mode match an optical resonance of the sample, the sample will heat up and cool down at the rate of the intensity beating, thus expanding and contracting, and consequently generating an acoustic response. The frequency of the acoustic response can be linked to the corresponding optical frequency (optical mode). Consequently, measuring the acoustic spectrum allows us to sample the optical spectrum.

It will be appreciated that this technique has a number of distinct advantages. The use of comb signals enables very high frequency selectivity over a broad bandwidth of perhaps several hundred megahertz (MHz) or even several gigahertz (GHz). The detection of the acoustic response of the sample obviates the need for signal subtraction and enables lower concentrations of a substance to be detected.

Figure 1:
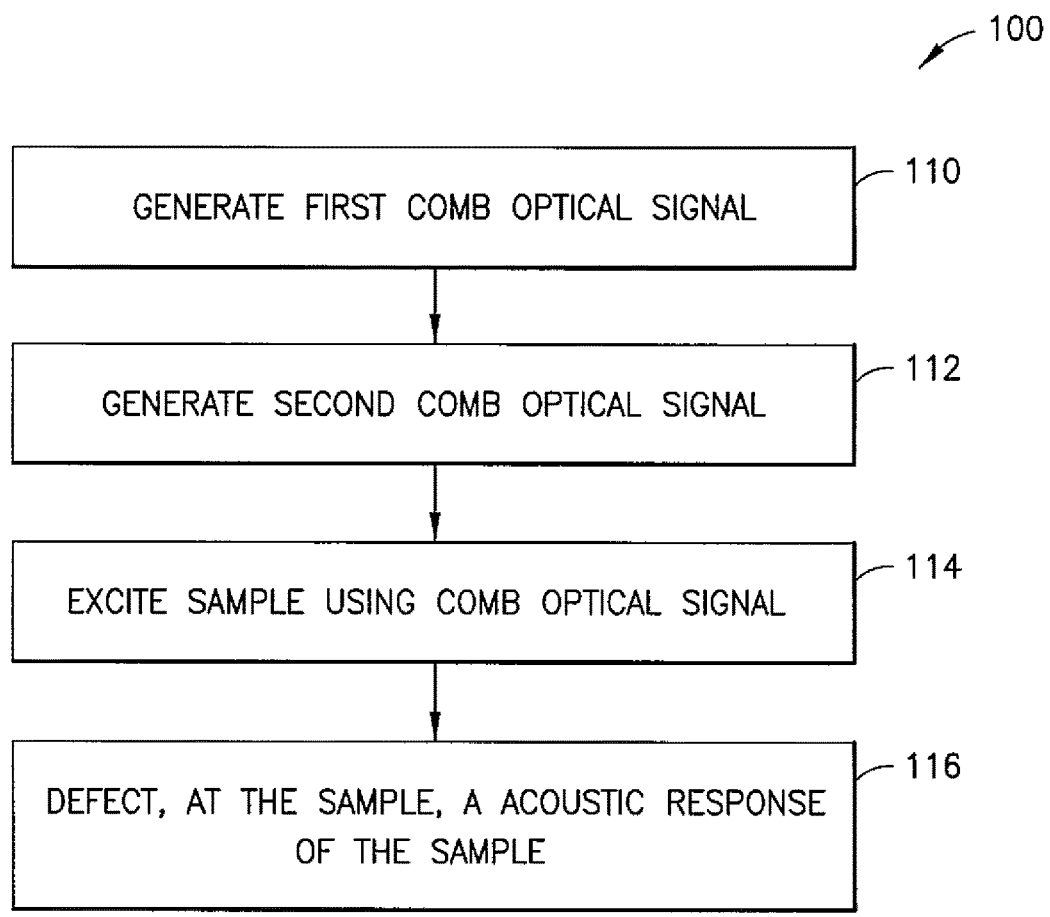
FIG. 1 illustrates an example of a method for multi-comb photo acoustic spectroscopy.

FIG. 1 illustrates an example of a method 100. In this example, the method 100 may be used for performing novel dual-comb photo acoustic spectroscopy.

At block 110, the method 100 comprises generating a first comb optical signal. At block 112, the method 100 comprises generating a second comb optical signal. The method 100, at block 114, then comprises exciting a sample using in combination the first comb optical signal and the second comb optical signal. The method 100, at block 116, then comprises detecting at the sample an acoustic response of the sample to that excitation of the sample.

Figure 2:
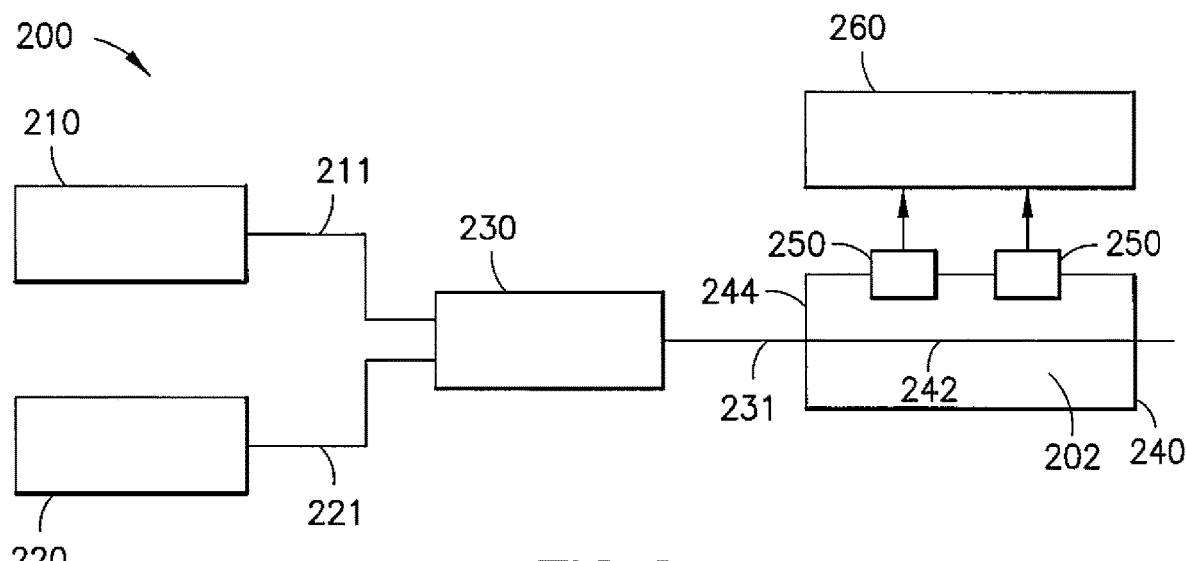
FIG. 2 illustrates an example of an apparatus for multi-comb photo acoustic spectroscopy.

FIG. 2 illustrates an example of an apparatus 200 that is suitable for performing the method 100. The apparatus 200 is a novel apparatus suitable for dual-comb photo acoustic spectroscopy.

The apparatus 200 comprises a generator 210 configured to generate a first comb optical signal 211 and a generator 220 configured to generate a second comb optical signal 221. The apparatus 200 comprises optics 230 configured to cause excitation of a sample 202 by combining the first comb optical signal 211 and the second comb optical signal 221. The apparatus 200 also comprises one or more pressure transducers 250 configured to detect, at the sample 202, pressure variations caused by an acoustic response of the sample 202 to said excitation.

It is important for the operation of the method, that the first comb optical signal 211 and the second comb optical signal 221 are combined such that they cause an acoustic response of the sample 202 at a heterodyne frequency determined by the absorption spectrum of the sample 202, the first comb signal 211 and the second comb signal 221. In some examples, the mixing of the first comb signal 211 and the second comb signal 221 may occur at the sample 202. In this example, the heterodyne beat frequencies may be produced directly by the physics of energy absorption. In other examples, the optics 230 may be used as an optical combiner configured to mix the first comb signal 211 and the second comb signal 221 at or before the sample 202 to produce heterodyne beating signals (optical signals that have an intensity that beats at the heterodyne frequency). For example, a polarizing beam splitter may be used to mix the first comb optical signal 211 and the second comb optical signal 221.

The first comb optical signal 211 and the second comb optical signal 221 are provided, in combination, as signal 231 to the sample 202 along an optical axis 242. In this example, the acoustic response of the sample 202 is detected off-axis. The one or more pressure transducers 250 configured to detect pressure variations caused by the acoustic response of the sample, are positioned so that they are not aligned with the optical axis 242. Examples of suitable pressure transducers include, but are not necessarily limited to, a microphone or microphones, a capacitance detector that detects a capacitance variation of a surface membrane and another electrode, an optical deflection detector configured to detect variation of a surface membrane and piezoelectric effect detectors.

In some, but not necessarily all examples, the sample 202 may be contained within a holder 240 for the sample 202. The holder keeps the sample 202 at a desired location and may, in some examples, also perform a retaining function and operate as a retainer. The sample may, for example, be a solid or a fluid such as a liquid or gas. The holder 240 may, for example, be a container or a gas cell. The combination 231 of the first comb optical signal 211 and the second comb optical signal 221 enter the holder 240 for the sample 202 along the axis 242 via an on-axis window 244 in the holder 240.

In some, but not necessarily all examples, each of the one or more pressure transducers 250 is configured to detect, at the sample 202, pressure variations caused by an acoustic response of the sample for different ranges of acoustic frequencies. Each of the one or more pressure transducers 250 may be optimized for a different range of acoustic frequencies.

The holder 240 may have an acoustic design designed to maximize acoustic coupling to the pressure transducers 250.

A spectrum analyzer 260 is connected or coupled to the one or more pressure transducers 250 and is configured to perform spectral analysis of the detected acoustic response of the sample 202 by measuring multiple lower frequency heterodyne beats produced by the combination 231 of the first comb optical signal 211 and the second comb optical signal 221. The bandwidth of the spectrum analyzer is preferably configured to cover the full range of possible lower frequency heterodyne beats produced by the combination of the first comb optical signal 211 and the second comb optical signal 221 which may for example, be in the range of, for example, a few kilohertz (kHz) to several gigahertz (GHz).

An optical mode of the first comb optical signal 211 may be paired with an optical mode of the second comb optical signal 221 that is its nearest neighbor in frequency. When an optical mode of the first comb optical signal 211 and a paired optical mode of the second comb optical signal 221 both fall within an absorption spectrum of the sample, a heterodyne beating of those modes excites the sample 202 to produce an acoustic response corresponding to the heterodyne beating of those modes. The spectrum analyzer 260 is configured to characterize an absorption spectrum of the sample 202 to identify the sample 202 by measuring heterodyne beating of the acoustic response of the sample to identify the optical mode of the first comb optical signal 211 and the paired optical mode of the second comb optical signal 221 that fall within an absorption spectrum of the sample 202.

Figure 3C:
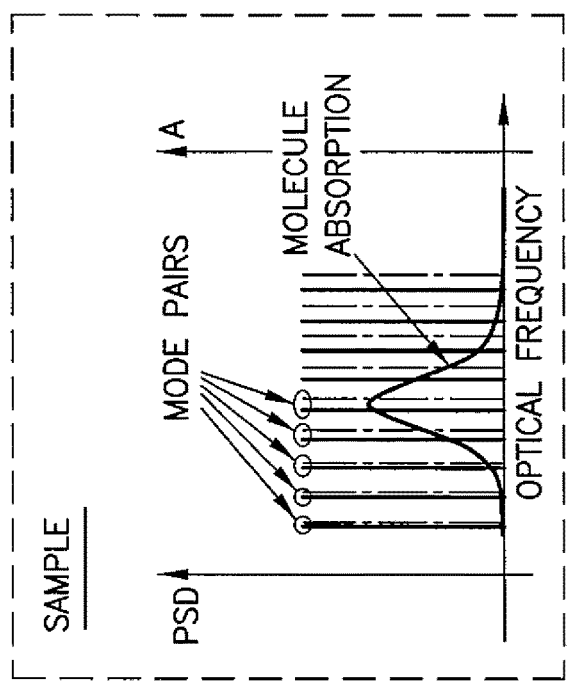
FIG. 3C illustrates, in the frequency domain, in combination the first comb optical signal and the second comb optical signal.
Figure 3A:
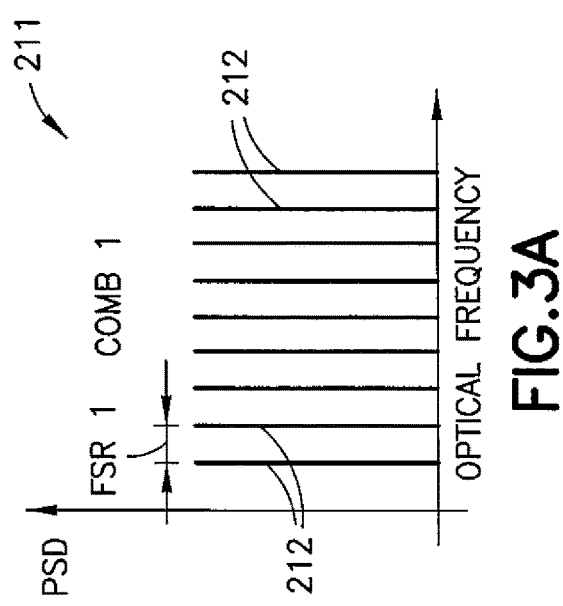
FIG. 3A illustrates, in the frequency domain, an example of the first comb optical signal.

FIG. 3A illustrates an example of the first comb optical signal 211 in the frequency domain. The first comb optical signal 211 comprises a series of separate, equally spaced optical modes 212. Each optical mode 212 is a single frequency or a very narrow band range of frequencies. Each optical mode 212 of the first comb optical signal 211 is separated by the same free spectral range $FSR_1$. The application of the first comb optical signal 211 to a sample 202 provides for the interrogation of that sample at each of the multiple frequencies, in parallel, represented by the optical modes of the comb. If each optical mode has an index, $k_1$=1, 2 . . . , then the multiple frequencies represented by the optical modes of the first comb are the set $c_1+k_1 \cdot FSR_1$.

In the time domain, the first comb optical signal 211 is represented by a pulse train of a constant repetition rate.

Figure 3B:
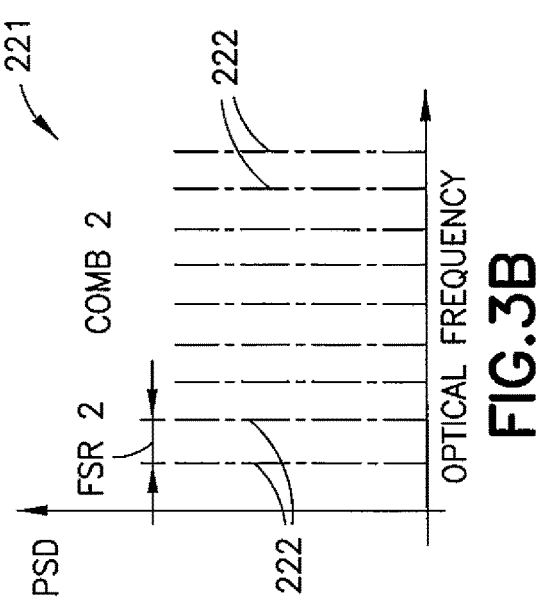
FIG. 3B illustrates, in the frequency domain, an example of the second comb optical signal

FIG. 3B illustrates an example of the second comb optical signal 221 in the frequency domain. The second comb optical signal 221 comprises a series of separate, equally spaced optical modes 222. Each optical mode 222 is a single frequency or a very narrow band range of frequencies. Each optical mode 222 of the second comb optical signal 221 is separated by the same free spectral range $FSR_2$. The application of the second comb optical signal 211 to a sample 202 provides for the interrogation of that sample 202 at each of the multiple frequencies, in parallel, represented by the optical modes of the comb. If each optical mode has an index, $k_2$=1, 2 . . . , then the multiple frequencies represented by the optical modes of the first comb are the set $c_2+k_2 \cdot FSR_2$.

In the time domain, the second comb optical signal 221 is represented by a pulse train of a constant repetition rate.

An optical mode $k_n$ of the first comb optical signal 211 may be paired with an optical mode $k_m$ of the second comb optical signal 221 that is its nearest neighbor in frequency. For example, the modes where n=m may be paired.

It will be appreciated, from FIG. 3C, that each of the optical modes of the first comb optical signal 211 is paired (associated) with a corresponding optical mode of the second comb optical signal 221.

The first mode of the first comb optical signal 211 and the first mode of the second comb optical signal 221 are paired. The frequency difference between the first mode of the first comb optical signal 211 and the first mode of the second comb optical signal 221 is specified by a heterodyne frequency for that pair, namely c+ΔF, where ΔF=(FSR$_1$−FSR$_2$), and where c is a constant.

The k$^{th}$ mode of the first comb optical signal 211 and the k$^{th}$ mode of the second comb optical signal 221 are paired. The frequency difference between the k$^{th}$ mode of the first comb optical signal 211 and the k$^{th}$ mode of the second comb optical signal 221 is specified by a heterodyne frequency for that pair, namely c+k·ΔF.

It is desirable to maintain phase-locking between modes so that c is a constant independent of k.

It will therefore be appreciated that each pair of optical modes of the first comb optical signal 211 and the second comb optical signal 221 are associated with different optical frequencies and also associated with different heterodyne frequencies.

The mixing of the k$^{th}$ mode of the first comb optical signal 211 and the k$^{th}$ mode of the second comb optical signal 221 produces heterodyne beating at the heterodyne frequency (the intensity modulates at the heterodyne frequency). As previously described, the mixing may occur at an optical combiner 230 or, alternatively, may occur as a consequence of absorption of the k$^{th}$ mode of the first comb optical signal 211 and the second comb optical signal 221 at the sample 202.

The combination of the first comb optical signal 211 and the second comb optical signal 221 would produce a combined beating optical signal at each of the different pairs of optical modes of the first comb optical signal 211 and the second comb optical signal 221 if mixing were available for each of the optical modes.

When an optical mode of the first comb optical signal 211 and a paired optical mode of the second optical signal 221 both fall within an absorption spectrum of the sample 202, a heterodyne beating of only those modes excites a sample 202 to produce an acoustic response corresponding to the heterodyne beating of those modes.

Figure 4A:
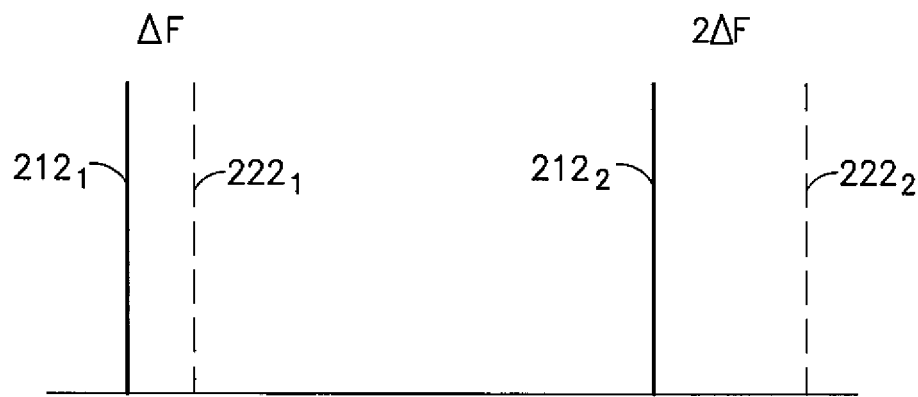
FIG. 4A illustrates a first pair of optical modes and a second pair of optical modes for the first comb optical signal and the second comb optical signal.
Figure 4B:
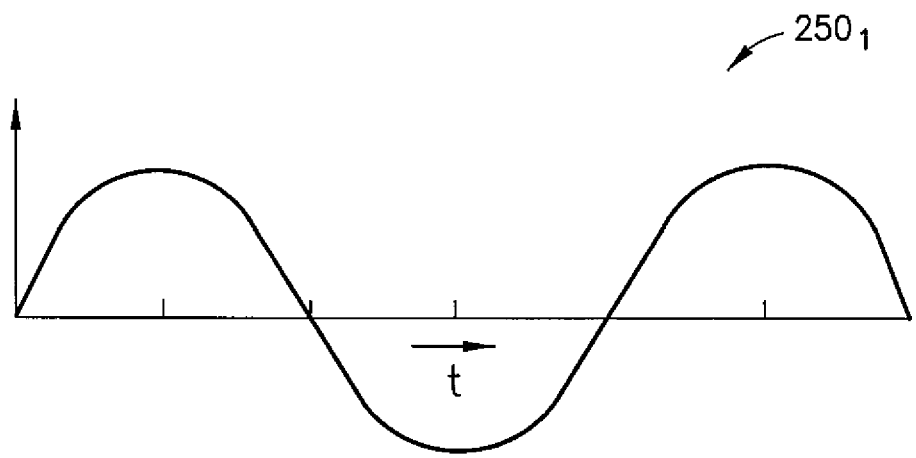
FIG. 4B illustrates an example of an acoustic response to the first pair of optical modes.
Figure 4C:
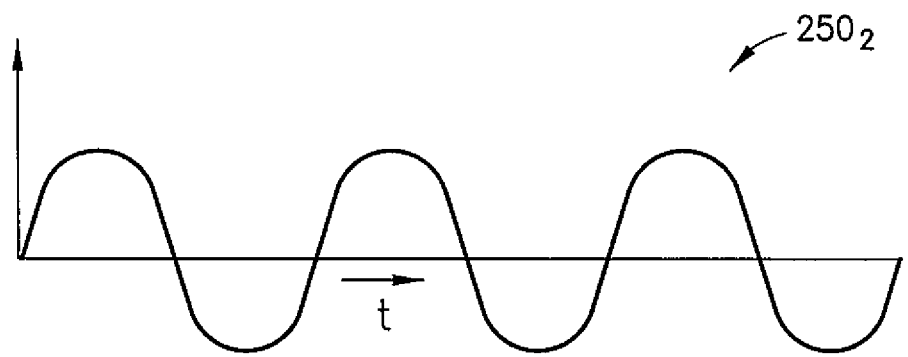
FIG. 4C illustrates an example of an acoustic response to the second pair of optical modes.

This is illustrated in FIGS. 4A, 4B and 4C.

FIG. 4A illustrates a first optical mode 212$_1$ of the first comb optical signal 211 and a paired first optical mode 222$_1$ of the second comb optical signal 221. If both of these modes fall within the absorption spectrum of the sample 202, a heterodyne beating of those modes excites the sample 202 to produce an acoustic response 250$_1$ corresponding to the heterodyne beating of those modes. This acoustic response 250$_1$ is illustrated in FIG. 4B. The pressure intensity oscillates at a frequency corresponding to the heterodyne frequency ΔF for a first optical mode 212$_1$ of the first comb optical signal 211 and the paired first optical mode 222$_1$ of the second comb optical signal 221.

FIG. 4A also illustrates a second optical mode 212$_2$ of the first comb optical signal 211 and a paired second optical mode 222$_2$ of the second comb optical signal 221. If both of these modes fall within the absorption spectrum of the sample 202, a heterodyne beating of those modes excites the sample 202 to produce an acoustic response 250$_2$ corresponding to the heterodyne beating of those modes. This acoustic response 250$_2$ is illustrated in FIG. 4C. The pressure intensity oscillates at a frequency corresponding to the heterodyne frequency 2·ΔF for a second optical mode 212$_2$ of the first comb optical signal 211 and the paired second optical mode 222$_2$ of the second comb optical signal 221.

The heterodyne beating of a pair of modes excites the sample 202 to produce an acoustic response corresponding to the heterodyne beating of those modes. The modulated power of the electromagnetic radiation caused by the heterodyne beating causes the sample 202 to heat up and cool down with the power modulation of the electromagnetic radiation, that is at the heterodyne beating frequency, to produce acoustic pressure waves at that frequency.

Therefore, if a pressure wave with a frequency ΔF as illustrated in FIG. 4B is detected, that frequency is specific to the pair of modes where k=1. This may allow the identification of the free spectral ranges FSR$_1$ and FSR$_2$ and consequently the frequencies at which the absorption has occurred. Identifying the frequencies at which the absorption has occurred enables an optical absorption spectra for the sample 202 to be created.

If a pressure wave with a frequency 2·ΔF as illustrated in FIG. 4C is detected, that frequency is specific to the pair of modes where k=2. This may allow the identification of the free spectral ranges FSR$_1$ and FSR$_2$ and consequently the frequencies at which the absorption has occurred. Identifying the frequencies at which the absorption has occurred enables an optical absorption spectra for the sample 202 to be created.

The spectrum analyzer 260 is configured to characterize the absorption spectrum of the sample 202 to identify the sample by measuring a heterodyne beating of the acoustic response of the sample 202 to identify the optical mode of the first comb optical signal 211 and the pair optical mode of the second comb optical signal 221.

It should be appreciated that in some examples, it is possible for the acoustic response of the sample 202 to include multiple different heterodyne beating frequencies indicating absorption at multiple different modes.

As the response of the sample 202 is directly proportional to absorption by the sample 202, the signal to noise ratio may be improved by increasing the intensity of the first comb optical signal 211 and the second comb optical signal 221.

Therefore, for samples 202 that are in extremely low concentrations, a very strong pulse of light from a laser can be used to produce the first comb optical signal 211 and the second comb optical signal 221 and increase the sensitivity of the apparatus 200. Furthermore, the very narrow frequency range of each of the optical modes of the comb optical signals provides a very precise specificity for the spectral analysis.

The apparatus 200 is therefore capable of processing the detected acoustic response of the sample 202 to detect a predetermined marker at a resolution of parts per million or parts per billion.

Figure 5:
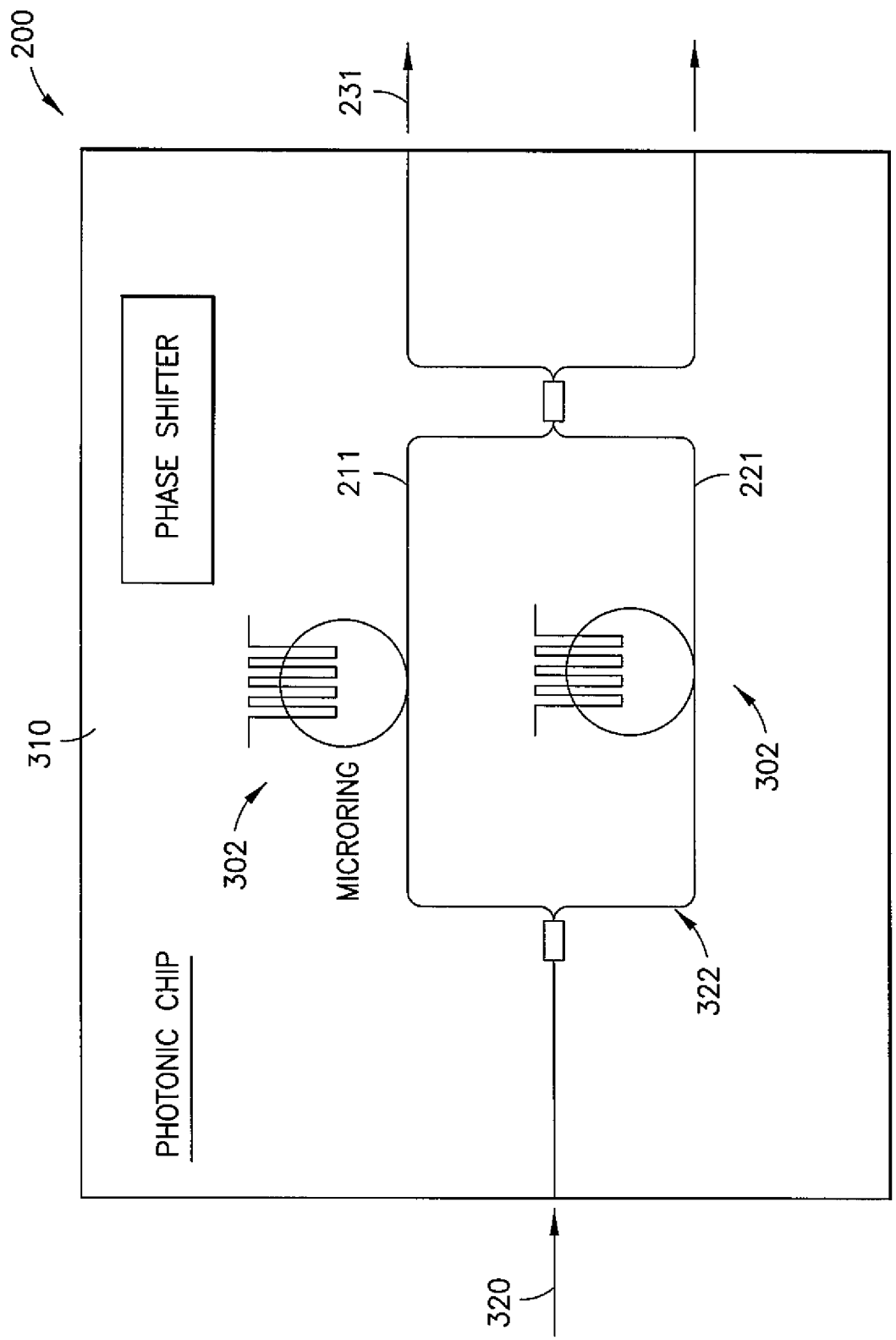
FIG. 5 illustrates an example of the apparatus embodied, at least in part, in a photonic chip.
Figure 6:
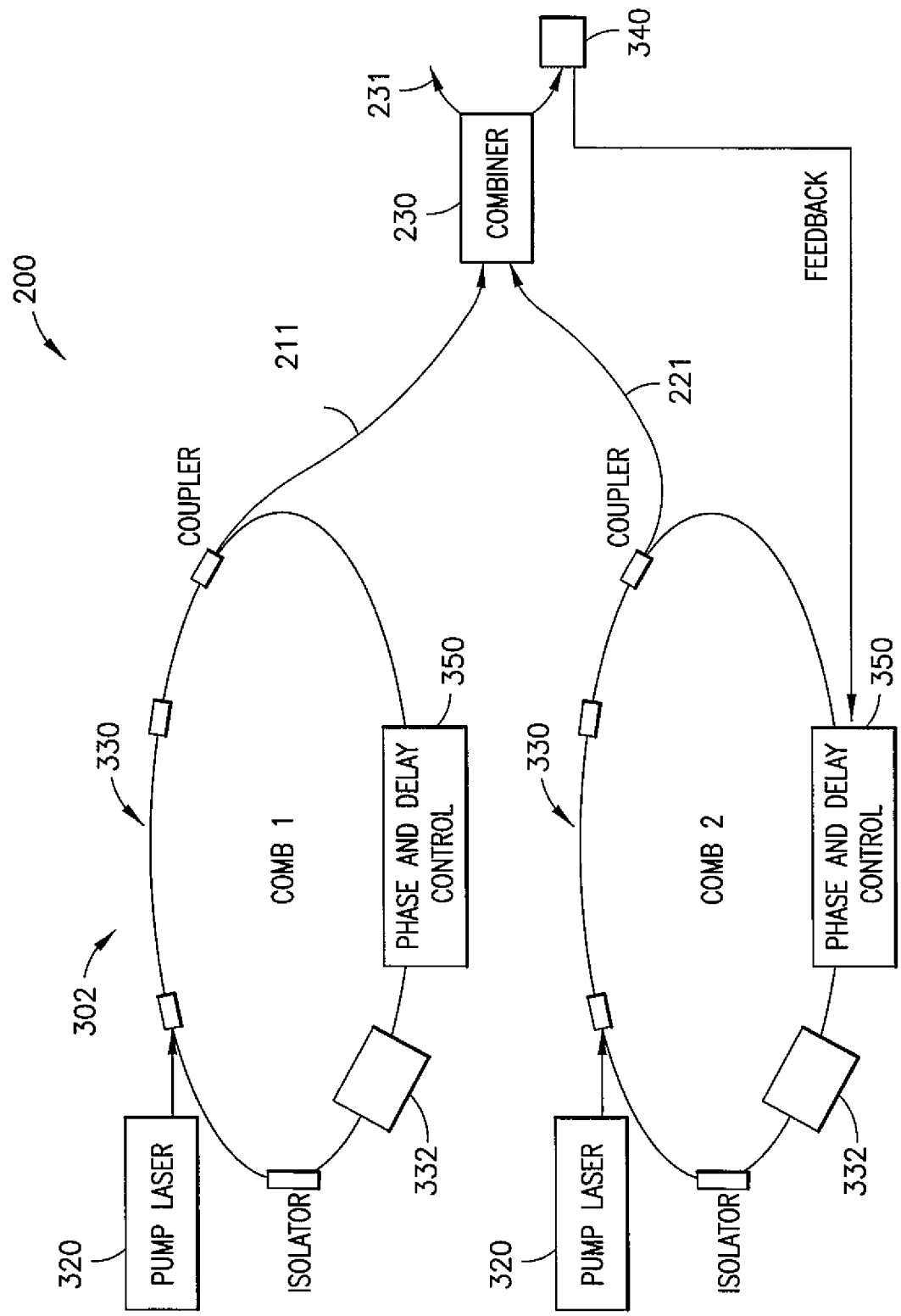
FIG. 6 illustrates an example of the apparatus using multiple fibre lasers.

FIGS. 5 and 6 illustrate examples of apparatus and methods for generating the first comb optical signal 211 and the second comb optical signal 221. A first tunable resonator 302 is used for generating the first comb optical signal 211 and the second tunable resonator 302 is used for generating the second comb optical signal 221. Phase coherency between the first comb optical signal 211 and the second comb optical signal 221 is maintained by different means in the example of FIG. 5 and in the example of FIG. 6.

FIG. 5 illustrates an example of a photonic chip 310 comprising a first tunable resonator 302 configured to generate the first comb optical signal 211, a second tunable resonator 302 configured to generate the second comb optical signal 221 and means for maintaining phase coherency between the first comb optical signal 211 and the second comb optical signal 221. In this example the means for maintaining phase coherency is a laser 320 configured to energize the first tunable resonator 302 and the second tunable resonator 302 simultaneously via a waveguide 322 that splits the laser energy between the first tunable resonator 302 and the second tunable resonator 302.

In this example, the first comb optical signal 211 and the second comb optical signal 221 are generated by pumping on-chip microring resonators 302 with a single wavelength laser 320. One of the resonance wavelengths of the ring can be tuned to match the wavelength of the laser. The ring resonances, are related to the optical path length of the resonator: $L=2\cdot\pi\cdot R\cdot n=k\cdot\lambda_k$, with L the optical path length, R the radius, n the effective index of the ring waveguide, k the mode number and $\lambda_k$ the resonant wavelengths. The resonance can be tuned by changing the effective index n of part of or all of the ring. This phase modulation can, for example, be done by tuning the temperature, by applying an electrical field in the waveguide or by injecting carriers. Once the pumped light resonates in one of the modes, cascaded non-linear optic processes generate light in the other modes of the resonator. These processes being coherent, all the generated modes are in phase with the pump laser.

For dual frequency comb generation, the laser light is separated in two arms pumping two rings 302 with a slight radius difference. Each ring needs to be tuned to the pump laser 320. Coarse tuning is performed with the phase modulator, and, when the resonance is close enough to the laser wavelength, a thermal lock occurs that further improves the resonance.

Both frequency combs are in phase with the pump laser and therefore with each other.

Control of the absolute value of the comb modes can be done by measuring a Carrier Envelop Offset (CEO) and the repetition rate (Rr) of the generated pulses. CEO measurement can be performed by generating double frequency or difference frequency from some modes of the comb and interfering them with other original modes of the comb. To do so, part of the comb output is directed to a nonlinear crystal/device that will generate the double or difference frequency. The output of this signal is combined with part of the original signal (the residual light that hasn't been converted by the crystal can be used) and thus produces a beating with a frequency equal to the CEO. The Rr can be measured directly with a photodiode at the output of the comb. Knowledge of the CEO and the Rr allows us to have precise knowledge of the absolute values of all the comb modes.

In order to scan the modes (i.e. tuning the CEO from 0 to Rr) the pump laser wavelength and the comb effective index needs to be tuned simultaneously. During this scan of the CEO, the value of Rr might change slightly but as long as it is known, the spectroscopy remains accurate.

FIG. 6 illustrates an example of an apparatus 200 comprising a first tunable resonator 302 configured to generate the first comb optical signal 211, a second tunable resonator 302 configured to generate the second comb optical signal 221 and means for maintaining phase coherency between the first comb optical signal 211 and the second comb optical signal 221. In this example the means for maintaining phase coherency is phase/delay locked loop.

In this example, the first tunable resonator 302 configured to generate the first comb optical signal 211 is a fiber laser and the second tunable resonator 302 configured to generate the second comb optical signal 221 is a different fiber laser.

In a fiber laser, gain can be obtained from an erbium doped fiber section 330 pumped with a continuous wave laser 320. The laser cavity can be obtained by closing the loop with other fiber elements or by introducing reflections. In order to obtain mode-locking, the overall gain (including gain section and other elements) in this cavity needs to be nonlinear, i.e. the gain needs to be stronger for higher power. This favors the formation of short pulses, which happens when the mode phases lock. This non-linearity can be obtained with power dependent polarization rotation by polarization controller 332 or by introducing saturable absorption elements in the cavity.

The two fiber generated combs 211, 221 have independent phases. It is therefore necessary to mutually lock their phases. This mutual phase can be measured directly from a control photodiode 340 at one of the combiner 230 outputs. The measured beatings' phases are directly proportional to the mode pair's mutual phases. These can be corrected by adjusting phase modulators 350 in the fiber laser cavity. The repetition rate Rr can be adapted with larger optical path changes such as (free space) optical delays.

Measurement of the absolute value of the comb modes can be performed in the same manner as for FIG. 5.

The method and apparatus described above may be used for various different applications. As described, for example, it may be used to detect a predetermined marker at a resolution of parts per million or parts per billion. In one example, the apparatus and method may be used to detect pollutants in air and/or water. In another example, the apparatus and/or method may be used to detect biological markers indicating, for example, a medical condition for a physiological response. It may for example be used to detect a biological marker in the body (e.g. In the blood, or a biological marker emanating from the body, e.g. in the breath, urine, sweat etc).

The method and apparatus are particularly useful for the detection of markers at concentrations and very low concentrations such as parts per million or parts per billion.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

The blocks illustrated in the Figs [FREF] may represent steps in a method and/or sections of code in the computer program [REF3]. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one" or by using "consisting".

In this brief description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some of or all other examples. Thus 'example', 'for example' or 'may' refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method comprising:
   generating a first comb optical signal;
   generating a second comb optical signal;
   exciting a sample using in combination the first comb optical signal and the second comb optical signal; and
   detecting at the sample an acoustic response of the sample,
   wherein the sample is optically excited along an axis, and the acoustic response of the sample is detected off-axis.

2. The method as claimed in claim 1, further comprising:
   using one or more pressure transducers to detect pressure variations caused by the acoustic response of the sample.

3. The method as claimed in claim 1, further comprising:
   using multiple pressure transducers to detect pressure variations caused by the acoustic response of the sample, wherein each of the multiple pressure transducers is optimized for a different range of acoustic frequencies.

4. The method as claimed in claim 3, wherein in combination the first comb optical signal and the second comb optical signal enter a holder for the sample along an axis via an on-axis window, wherein multiple pressure transducers are configured within the holder off-axis.

5. The method as claimed in claim 1, further comprising:
   performing spectral analysis of the detected acoustic response of the sample using a spectrum analyzer configured to measure a range of lower frequency heterodyne beats produced by the combination of the first comb optical signal and the second comb optical signal.

6. The method as claimed in claim 1, wherein, when an optical mode of the first comb optical signal and a paired optical mode of the second comb optical signal both fall with an absorption spectrum of the sample, a heterodyne beating of those modes excites the sample to produce an acoustic response corresponding to the heterodyne beating of those modes, and
   wherein the method further comprises:
      characterizing an absorption spectrum of the sample to identify the sample by measuring a heterodyne beating of the acoustic response of the sample to identify the optical mode of the first comb and the paired optical mode of the second comb.

7. The method as claimed in claim 1, wherein a first tunable resonator is used for generating the first comb optical signal, a second tunable resonator is used for generating the second comb optical signal, and means for maintaining phase coherency between the first comb optical signal and the second comb optical signal are used.

8. The method as claimed in claim 1, further comprising:
   processing the detected acoustic response of the sample to detect a predetermined marker at a resolution of parts per million or parts per billion.

9. An apparatus comprising:
   a generator configured to generate a first comb optical signal;
   a generator configured to generate a second comb optical signal;
   optics configured to cause excitation of a sample by combining the first comb optical signal and the second comb optical signal; and
   one or more pressure transducers configured to detect at the sample pressure variations caused by an acoustic response of the sample, and
   further comprising:
      a holder for the sample, wherein the combination of the first comb optical signal and the second comb optical signal enters the holder for the sample along an axis via an on-axis window in the holder, and wherein each of the one or more pressure transducers configured to detect at the sample pressure variations caused by an acoustic response of the sample is optimized for a different range of acoustic frequencies and is located off-axis.

10. The apparatus as claimed in claim 9, further comprising
   a spectrum analyzer configured to perform spectral analysis of the detected acoustic response of the sample by measuring multiple lower frequency heterodyne beats produced by the combination of the first comb optical signal and the second comb optical signal, wherein, when an optical mode of the first comb and a paired optical mode of the second comb both fall with an absorption spectrum of the sample, a heterodyne beating of those modes excites the sample to produce an acoustic response corresponding to the heterodyne beating of those modes, the spectrum analyzer being further configured to characterize an absorption spectrum of the sample to identify the sample by measuring a heterodyne beating of the acoustic response of the sample to identify the optical mode of the first comb optical signal and the paired optical mode of the second comb optical signal.

11. The apparatus as claimed in claim 9, further comprising,:

an optical combiner configured to mix the first comb and the second comb at or before the sample to produce heterodyne beating signals.

12. The apparatus as claimed in claim 9, further comprising:

a first tunable resonator configured to generate the first comb optical signal, a second tunable resonator configured to generate the second comb optical signal, and means for maintaining phase coherency between the first comb optical signal and the second comb optical signal.

13. The apparatus as claimed in claim 9, further comprising:

a photonic chip comprising a first tunable resonator configured to generate the first comb optical signal, a second tunable resonator configured to generate the second comb optical signal, and a laser configured to energize the first tunable resonator and the second tunable resonator.

* * * * *